United States Patent
Ichikawa et al.

(10) Patent No.: US 8,089,243 B2
(45) Date of Patent: Jan. 3, 2012

(54) POWER SUPPLY DEVICE AND VEHICLE INCLUDING THE SAME

(75) Inventors: Shinji Ichikawa, Toyota (JP); Tetsuhiro Ishikawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 400 days.

(21) Appl. No.: 12/310,985

(22) PCT Filed: Oct. 9, 2007

(86) PCT No.: PCT/JP2007/070040
§ 371 (c)(1),
(2), (4) Date: Mar. 13, 2009

(87) PCT Pub. No.: WO2008/050623
PCT Pub. Date: May 2, 2008

(65) Prior Publication Data
US 2010/0001866 A1    Jan. 7, 2010

(30) Foreign Application Priority Data
Oct. 24, 2006    (JP) .................................. 2006-288874

(51) Int. Cl.
*H02J 7/14* (2006.01)
(52) U.S. Cl. ...................................... 320/104; 307/10.1
(58) Field of Classification Search ................. 320/10.1, 320/104; 307/10.1
See application file for complete search history.

(56) References Cited

U.S. PATENT DOCUMENTS

| 6,163,135 A | 12/2000 | Nakayama et al. |
|---|---|---|
| 2001/0024104 A1 | 9/2001 | Suzuki |
| 2002/0003417 A1 | 1/2002 | Bito et al. |

FOREIGN PATENT DOCUMENTS

| JP | A-06-141488 | 5/1994 |
|---|---|---|
| JP | A-08-098304 | 4/1996 |
| JP | A-09-168240 | 6/1997 |
| JP | A-11-026032 | 1/1999 |
| JP | A-2000-040532 | 2/2000 |
| JP | A-2000-092614 | 3/2000 |
| JP | A-2001-268719 | 9/2001 |
| JP | A-2001-314039 | 11/2001 |
| JP | A-2003-209969 | 7/2003 |
| JP | A-2004-260905 | 9/2004 |
| JP | A-2005-027479 | 1/2005 |
| JP | A-2006-217757 | 8/2006 |
| JP | A-2008-117565 | 5/2008 |

*Primary Examiner* — Bot Ledynh
(74) *Attorney, Agent, or Firm* — Oliff & Berridge, PLC (57) ABSTRACT

A power supply device includes a power storage unit capable of being charged and a control unit controlling charging of the power storage unit. Control unit includes a battery ECU for setting, at the start of charging of the power storage unit, a target value of state of charge of the power storage unit to a first value based on the condition of power storage unit and setting, when a temperature increase instruction (change instruction) is received after the start of charging, the target value to a predetermined second value higher than the first value, and a converter ECU for executing the charging process so that the state of charge of the power storage unit attains to the target value.

10 Claims, 8 Drawing Sheets

| INPUT SIGNAL |
| --- |
| SMART DOOR UNLOCK SIGNAL (SDU) |
| KEYLESS DOOR UNLOCK SIGNAL (KDU) |
| MANUAL TEMPERATURE INCREASE BUTTON ON SIGNAL (BON1) |
| CHARGE CONNECTOR OPEN SIGNAL (OP) |
| REMOTE TEMPERATURE INCREASE BUTTON ON SIGNAL (BON2) |
| TEMPERATURE INCREASE REQUEST SIGNAL FROM HOUSE (DMN) |
| SIGNAL FROM PORTABLE TELEPHONE (MP) |

POWER SUPPLY DEVICE AND VEHICLE INCLUDING THE SAME

TECHNICAL FIELD

The present invention relates to a power supply device and a vehicle including the same. More specifically, the present invention relates to a power supply device including a power storage unit, as well as to a vehicle including the same.

BACKGROUND ART

Recently, considering environmental issues, attention has been paid to a vehicle employing a motor as a drive power source, such as an electric vehicle, a hybrid vehicle and a fuel cell vehicle. Such a vehicle includes a power storage unit implemented, for example, by a secondary battery or an electric double layer capacitor for supplying electric power to the motor, and converting kinetic energy to electric energy during regenerative braking and storing such electric power.

In such a vehicle employing the motor as the drive force source, in order to enhance acceleration performance and running performance such as travel distance, greater charge/discharge capacity of the power storage unit is desired. Here, a configuration where a plurality of power storage units are mounted has been proposed as a method of increasing the charge/discharge capacity of the power storage unit.

On the other hand, as the power storage unit stores electric energy utilizing electrochemical action, charge/discharge characteristics thereof are susceptible to a temperature. A general power storage unit is lower in the charge/discharge performance as the temperature is lower. Accordingly, in order to maintain prescribed charge/discharge performance, temperature management, in particular temperature increase control, of the power storage unit is important.

For example, Japanese Patent Laying-Open No. 11-26032 discloses a heating-up device for a battery in an electric vehicle that raises a temperature of the battery mounted on the electric vehicle. According to this device, if a detected temperature of the battery is equal to or lower than a prescribed value when an instruction is issued from at least one of unlock detection means for detecting unlock of the vehicle, timer means for notification of a set time, and input means for input of operational information, control means carries out control such that an output current of the battery greater than a current required in the battery flows.

The heating-up device disclosed in Japanese Patent Laying-Open No. 11-26032 increases battery temperature by the discharge of battery. Therefore, electric power stored in the battery is undesirably wasted. The reference above, however, does not disclose any specific method to solve such a problem.

DISCLOSURE OF THE INVENTION

An object of the present invention is to provide a power supply device that can more reliably increase temperature of power storage unit while preventing decrease in energy efficiency.

In short, the present invention provides a power supply device mounted on a vehicle, including a power storage unit capable of being charged, and a control unit controlling charging of the power storage unit. The control unit includes a change instruction generation unit, a target value setting unit, and a charge processing unit. The change instruction generation unit generates a change instruction instructing change of state of charge of the power storage unit. The target value setting unit sets, when charging of the power storage unit starts, a target value of state of charge of the power storage unit to a first value based on the condition of the power storage unit, and sets, when the change instruction is received after the start of charging of the power storage unit, the target value to a second value higher than the first value. The charge processing unit executes a charging operation based on the target value.

Preferably, information representing the condition of the power storage unit is information of temperature around the power storage unit. The control unit further includes an amount of change calculating unit calculating an amount of change in state of charge of the power storage unit necessary to increase temperature of the power storage unit. The target value setting unit stores the second value in advance, and calculates the first value by subtracting the amount of change from the second value.

More preferably, the change instruction generation unit determines a start time of starting change of the state of charge of the power storage unit based on a designated charge end time and the amount of change, and when current time reaches the start time, generates the change instruction.

More preferably, the change instruction generation unit generates the change instruction in response to a temperature increase request input from outside.

More preferably, the change instruction generation unit outputs the change instruction when it receives the temperature increase request from a transmission device provided in a house. The transmission device transmits the temperature increase request in response to a result of detection by a sensor detecting a user going out from the house.

More preferably, the change instruction generation unit outputs the change instruction in response to a remote operation by a user.

According to another aspect, the present invention provides a vehicle, including a power supply device. The power supply device includes a power storage unit capable of being charged, and a control unit controlling charging of the power storage unit. The control unit includes a change instruction generation unit, a target value setting unit, and a charge processing unit. The change instruction generation unit generates a change instruction instructing change of state of charge of the power storage unit. The target value setting unit sets, when charging of the power storage unit starts, a target value of state of charge of the power storage unit to a first value based on the condition of the power storage unit, and sets, when the change instruction is received after the start of charging of the power storage unit, the target value to a second value higher than the first value. The charge processing unit executes a charging operation based on the target value.

Preferably, information representing the condition of the power storage unit is information of temperature around the power storage unit. The control unit further has an amount of change calculating unit calculating an amount of change in state of charge of the power storage unit necessary to increase temperature of the power storage unit. The target value setting unit stores the second value in advance, and calculates the first value by subtracting the amount of change from the second value.

More preferably, the change instruction generation unit determines a start time of starting change of the state of charge of the power storage unit based on a designated charge end time and the amount of change, and when current time reaches the start time, generates the change instruction.

More preferably, the change instruction generation unit generates the change instruction in response to a temperature increase request input from outside.

More preferably, the change instruction generation unit outputs the change instruction when it receives the temperature increase request from a transmission device provided in a house. The transmission device transmits the temperature increase request in response to a result of detection by a sensor detecting a user going out from the house.

More preferably, the change instruction generation unit outputs the change instruction in response to a remote operation by a user.

Therefore, according to the present invention, a power supply device that can more reliably increase the temperature of power storage device while preventing decrease in energy efficiency can be provided.

BEST MODES FOR CARRYING OUT THE INVENTION

In the following, embodiments of the present invention will be described in detail with reference to the figures. In the figures, the same or corresponding portions are denoted by the same reference characters and description thereof will not be repeated.

[Vehicle Configuration]

Figure 1:
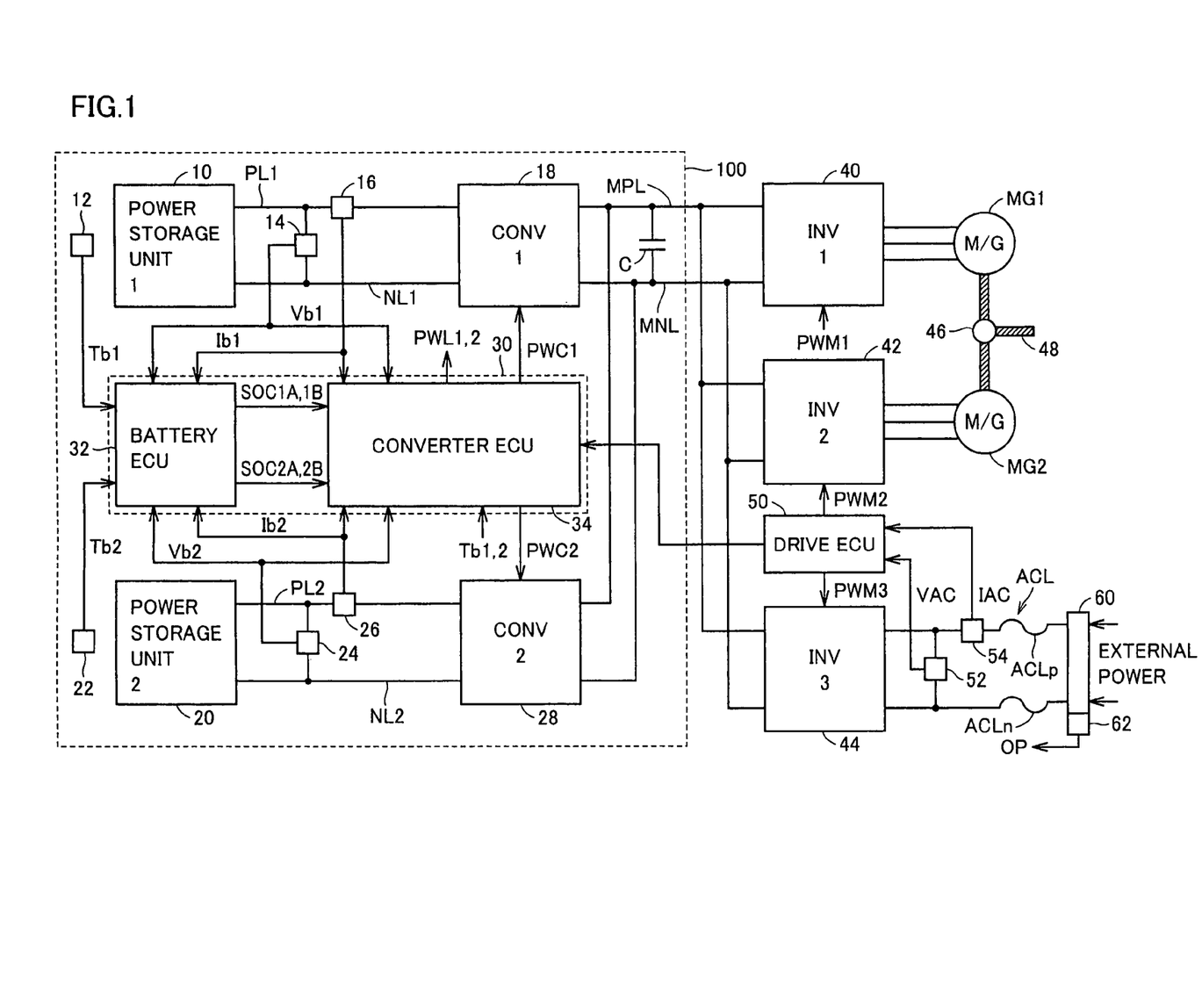
FIG. 1 is a schematic configuration diagram showing a substantial part of a vehicle including a power supply device 100 according to an embodiment of the present invention.

FIG. 1 is a schematic configuration diagram showing a substantial part of a vehicle including a power supply device 100 according to an embodiment of the present invention.

Referring to FIG. 1, the vehicle includes power supply device 100, a first inverter (INV1) 40, a second inverter (INV2) 42, a third inverter (INV3) 44, motor-generators MG1, MG2, and a drive ECU (Electrical Control Unit) 50.

Inverters 40, 42, motor-generators MG1, MG2, and drive ECU 50 configure a drive force generation unit generating drive force of the vehicle. In the present embodiment, the vehicle runs by transmitting to wheels (not shown), drive force generated by electric power supplied to the drive force generation unit from power supply device 100. In addition, during regeneration, the vehicle causes the drive force generation unit to generate electric power from kinetic energy and recovers the electric power in power supply device 100.

In the present embodiment, power supply device 100 includes two power storage units. Power supply device 100 supplies and receives DC electric power to and from the drive force generation unit through a main positive bus MPL and a main negative bus MNL.

Inverters 40, 42 are connected in parallel to main positive bus MPL and main negative bus MNL, and supply/receive electric power to/from power supply device 100. That is, inverters 40, 42 convert drive electric power (DC electric power) received through main positive bus MPL and main negative bus MNL to AC electric power and supply the AC electric power to motor-generators MG1, MG2 respectively. In addition, inverters 40, 42 convert AC electric power generated by motor-generators MG1, MG2 to DC electric power and supply the resultant DC electric power as the regenerative electric power to power supply device 100. By way of example, inverters 40, 42 are constituted of a bridge circuit including switching elements of three phases, and generate three-phase AC electric power by performing a switching (circuit opening/closing) operation in response to switching instructions PWM1, PWM2 received from drive ECU 50.

Motor-generators MG1, MG2 are configured to be able to generate rotational drive force by receiving AC electric power supplied from inverters 40, 42 respectively and to be able to generate electric power by receiving external rotational drive force. For example, motor-generators MG1, MG2 are implemented by a three-phase AC electric rotating machine including a rotor having permanent magnets embedded. Motor-generators MG1, MG2 are coupled to a power split device 46. The drive force generated at motor generators MG1 and MG2 are transmitted to wheels (not shown) via a drive shaft 48.

If the drive force generation unit is applied to a hybrid vehicle, motor-generators MG1, MG2 are also coupled to a not-shown engine through power split device 46 or drive shaft 48. Then, drive ECU 50 carries out control such that an optimal ratio between the drive force generated by the engine and the drive force generated by motor-generators MG1, MG2 is attained. If the drive force generation unit shown in FIG. 1 is applied to such a hybrid vehicle, motor-generator MG1 may serve solely as the generator, while motor-generator MG2 may serve solely as the motor.

Drive ECU 50 executes a program stored in advance. More specifically, drive ECU 50 calculates torque target values TR1, TR2 and speed target values MRN1, MRN2 of motor-generators MG1, MG2, based on a signal transmitted from each not-shown sensor, a running state, variation in an accelerator position, a stored map, or the like. Then, drive ECU 50 generates switching instructions PWM1, PWM2 and controls inverters 40, 42 such that generated torque and speed of motor-generators MG1, MG2 attain torque target values TR1, TR2 and speed target values MRN1, MRN2 respectively. In addition, drive ECU 50 outputs calculated torque target values TR1, TR2 and speed target values MRN1, MRN2 to power supply device 100.

In addition, in the present embodiment, inverter 44 is connected to main positive bus MPL and main negative bus MNL, in parallel to inverters 40, 42. Inverter 44 is further electrically connected to a commercial power supply (not shown) in a house outside the vehicle through a supply line ACL and a charge connector 60 such that electric power can be supplied and received to and from the commercial power supply.

Receiving commercial electric power supplied from the outside of the vehicle through charge connector 60 and supply line ACL, inverter 44 generates DC electric power for supply to power supply device 100. For example, inverter 44 is implemented by a single-phase inverter so as to adapt to electric power used in the house (not shown) outside the vehicle.

A supply current detection unit 54 inserted in a positive supply line ACLp detects a supply current IAC from the commercial power supply and outputs the detected value to drive ECU 50. In addition, a supply voltage detection unit 52 connected between positive supply line ACLp and a negative supply line ACLn detects a supply voltage VAC from the commercial power supply and outputs the detected value to drive ECU 50.

In addition, an opening and closing detection unit 62 detects opening of charge connector 60, that is, electrical disconnection between the vehicle and the commercial power supply. Opening and closing detection unit 62 outputs a signal OP indicating the detected result to power supply device 100.

[Configuration of Power Supply Device]

Power supply device 100 includes a smoothing capacitor C, a first converter (CONV1) 18, a second converter (CONV2) 28, a first power storage unit 10, a second power storage unit 20, charge/discharge current detection units 16, 26, charge/discharge voltage detection units 14, 24, temperature detection units 12, 22, and a control unit 30. Control unit 30 includes a battery ECU 32 and a converter ECU 34.

Smoothing capacitor C is connected between main positive bus MPL and main negative bus MNL, and reduces a fluctuating component contained in drive electric power output from converters 18, 28 and regenerative electric power output from the drive force generation unit.

Converters 18, 28 are provided between main positive bus MPL, main negative bus MNL and power storage units 10, 20, and perform a voltage conversion operation between power storage units 10, 20 and main positive bus MPL, main negative bus MNL, respectively. More specifically, converters 18, 28 boost discharge electric power from power storage units 10, 20 to a prescribed voltage for supply as drive electric power, while they down-convert regenerative electric power supplied from the drive force generation unit to a prescribed voltage for charging power storage units 10, 20. For example, converters 18, 28 are implemented by a boost/buck chopper circuit.

Power storage units 10, 20 are connected in parallel to main positive bus MPL and main negative bus MNL with converters 18, 28 being interposed respectively. For example, power storage unit 10, 20 is implemented by a secondary battery configured to be capable of charge/discharge, such as a nickel metal hydride battery or a lithium-ion battery, or by an electric double layer capacitor.

Charge/discharge current detection units 16, 26 are inserted in the power lines connecting power storage units 10, 20 to converters 18, 28 respectively, detect charge/discharge current values Ib1, Ib2 used in charge/discharge of power storage units 10, 20 respectively, and output the result of detection to battery ECU 32 and converter ECU 34.

Charge/discharge voltage detection units 14, 24 are connected between the power line connecting power storage unit 10 to converter 18 and the power line connecting power storage unit 20 to converter 28, respectively, detect charge/discharge voltage values Vb1, Vb2 of power storage units 10, 20 respectively, and output the result of detection to control unit 30 (battery ECU 32 and converter ECU 34).

Temperature detection units 12, 22 are arranged in the proximity of battery cells and the like constituting power storage units 10, 20 respectively, detect power storage unit temperatures Tb1, Tb2 which represent ambient temperatures of power storage units 10, 20, and output the result of detection to battery ECU 32. It is noted that temperature detection units 12, 22 may be configured to output a representative value obtained for example by averaging processing, based on the result of detection by a plurality of detection elements arranged in correspondence with a plurality of battery cells constituting power storage units 10, 20. Though it is preferable to provide temperature detection units 12 and 22 in the vicinity of power storage units 10 and 20, respectively, these may be arranged, for example, to detect temperature outside the vehicle.

Battery ECU 32 calculates SOC (State of Charge) in respective power storage units 10, 20, based on charge/discharge current values Ib1, Ib2 received from charge/discharge current detection units 16, 26, charge/discharge voltage values Vb1, Vb2 received from charge/discharge voltage detection units 14, 24, and power storage unit temperatures Tb1, Tb2 received from temperature detection units 12, 22.

Battery ECU 32 determines whether the temperature of power storage units 10, should be raised or not based on power storage unit temperatures Tb1, Tb2 received from temperature detection units 12, 22, respectively. Specifically, battery ECU 32 determines whether each of power storage unit temperatures Tb1, Tb2 is lower than a corresponding lower limit temperature (such as −15° C.). Then, battery ECU 32 carries out temperature increase control of the power storage unit of which temperature is lower than the corresponding lower limit temperature.

Battery ECU 32 sets SOC target value of power storage unit 10 to SOC1A before starting temperature increase of power storage unit 10. When temperature increase of power storage unit 10 is to be started, battery ECU 32 changes the SOC target value from SOC1A to SOC1B. Similarly, battery ECU 32 sets target SOC of power storage unit 20 to SOC2A before starting temperature increase of power storage unit 20. When temperature increase of power storage unit 20 is to be started, battery ECU 32 changes the SOC target value from SOC2A to SOC2B.

It is noted that SOC1A<SOC1B, and SOC2A<SOC2B. Further, the values of SOC1B and SOC2B are set to a prescribed value (for example, 80%) with which power storage units 10 and 20 are almost fully charged.

Converter ECU 34 generates drive signals PWC1 and PWC2 for driving converters 18 and 28, respectively, based on charge/discharge currents Ib1, Ib2, charge/discharge voltages Vb1, Vb2, temperatures Tb1, Tb2 of power storage units, SOC (SOC1A, SOC1B, SOC2A, SOC2B) from battery ECU 32 and the like. Converters 18 and 28 are controlled by drive signals PWC1 and PWC2, respectively. Accordingly, external electric power is supplied through converters 18 and 28 to power storage units 10 and 20, respectively. Thus, power storage units 10 and 20 can be charged.

When the SOC target value of power storage unit 10 is SOC1B, converter ECU 34 controls converter 18 in accordance with the target value. Here, the temperature of power storage unit 10 increases as power storage unit 10 is charged. The same applies to power storage unit 20, and when the target SOC value of power storage unit 20 is SOC2B, converter ECU 34 controls converter 28 in accordance with the target value. Here, the temperature of power storage unit 20 increases as power storage unit 20 is charged.

Figure 2:
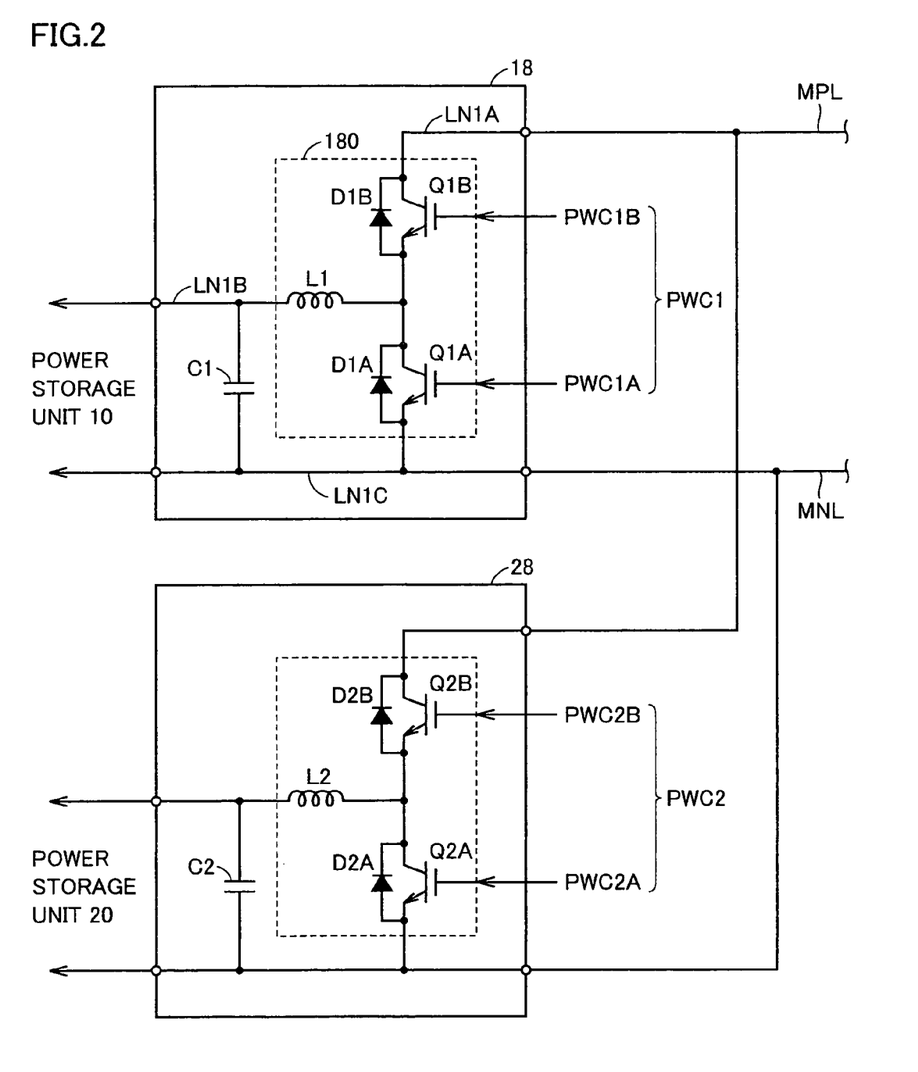
FIG. 2 is a schematic configuration diagram of converters 18 and 28 according to an embodiment of the present invention.

FIG. 2 is a schematic configuration diagram of converters 18, 28 according to the embodiment of the present invention.

Referring to FIG. 2, converter 18 is constituted of a chopper circuit 180 and a smoothing capacitor C1.

Chopper circuit 180, during discharge, boosts the DC electric power received from power storage unit 10 in response to switching instruction PWC1 from converter ECU 34, while chopper circuit 180, during charging, down converts the DC electric power received through main positive bus MPL and main negative bus MNL. Chopper circuit 180 includes a positive bus LN1A, a negative bus LN1C, a line LN1B, transistors Q1A, Q1B representing a switching element, diodes D1A, D1B, and an inductor L1.

Positive bus LN1A has one end connected to a collector of transistor Q1B and the other end connected to main positive bus MPL. In addition, negative bus LN1C has one end connected to a negative side of power storage unit 10 and the other end connected to main negative bus MNL.

Transistors Q1A, Q1B are connected in series between negative bus LN1C and positive bus LN1A. Transistor Q1A has an emitter connected to negative bus LN1C and transistor Q1B has the collector connected to positive bus LN1A. In addition, diodes D1A, D1B allowing current flow from the emitter side to the collector side are connected between the collector and the emitter of transistors Q1A, Q1B respectively. Further, inductor L1 is connected to a connection point of transistor Q1A and transistor Q1B.

Line LN1B has one end connected to the positive side of power storage unit 10 and the other end connected to inductor L1.

Smoothing capacitor C1 is connected between line LN1B and negative bus LN1C, and reduces the AC component contained in the DC voltage across line LN1B and negative bus LN1C.

The voltage conversion operation (boost operation and down-converting operation) of converter 18 will be described hereinafter. In the boost operation, converter ECU 34 maintains transistor Q1B in the ON state, and turns on/off transistor Q1A at a prescribed duty ratio. During the ON period of transistor Q1A, a discharge current flows from power storage unit 10 to main positive bus MPL sequentially through line LN1B, inductor L1, diode D1B, and positive bus LN1A. At the same time, a pump current flows from power storage unit 10 sequentially through line LN1B, inductor L1, transistor Q1A, and negative bus LN1C. Inductor L1 accumulates electromagnetic energy by means of the pump current. Successively, when transistor Q1A makes transition from the ON state to the OFF state, inductor L1 superimposes the accumulated electromagnetic energy onto the discharge current. Consequently, the average voltage of the DC electric power supplied from converter 18 to main positive bus MPL and main negative bus MNL is boosted by a voltage corresponding to the electromagnetic energy accumulated in inductor L1 in accordance with the duty ratio.

On the other hand, in the down-converting operation, converter ECU 34 turns on/off transistor Q1B at a prescribed duty ratio, and maintains transistor Q1A in the OFF state. During the ON period of transistor Q1B, the charge current flows from main positive bus MPL to power storage unit 10 sequentially through positive bus LN1A, transistor Q1B, inductor L1, and line LN1B. Successively, when transistor Q1B makes transition from the ON state to the OFF state, magnetic flux is generated to prevent current variation in inductor L1. Accordingly, the charge current continues to flow sequentially through diode D1A, inductor L1 and line LN1B. Meanwhile, from a viewpoint of electric energy, it is solely during the ON period of transistor Q1B that the DC electric power is supplied through main positive bus MPL and main negative bus MNL. Therefore, if the charge current is maintained constant (if inductance of inductor L1 is sufficiently large), the average voltage of the DC electric power supplied from converter 18 to power storage unit 10 is set to a value obtained by multiplying the DC voltage across main positive bus MPL and main negative bus MNL by the duty ratio.

In order to control such a voltage conversion operation of converter 18, converter ECU 34 generates switching instruction PWC1 consisting of a switching instruction PWC1A controlling on/off of transistor Q1A and a switching instruction PWC1B controlling on/off of transistor Q1B.

As the configuration and the operation of converter 28 are also similar to those of converter 18 described above, detailed description will not be repeated.

[Structure of Battery ECU]

Figure 3:
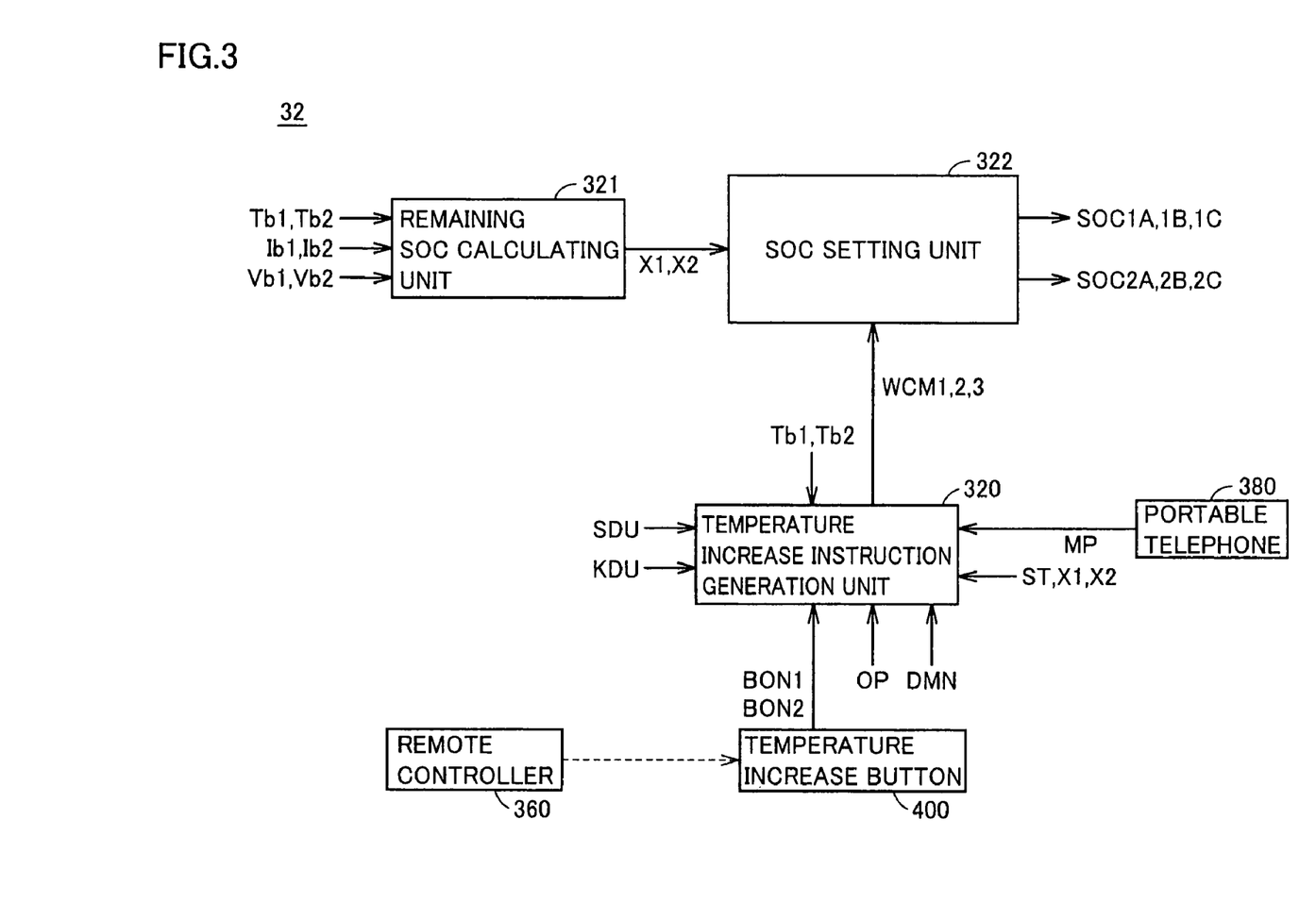
FIG. 3 is a functional block diagram of a battery ECU 32 shown in FIG. 1.

FIG. 3 is a functional block diagram of battery ECU 32 shown in FIG. 1. The functions of various blocks shown in FIG. 3 may be implemented by hardware or software.

Referring to FIG. 3, battery ECU 32 includes a temperature increase instruction generation unit 320, a remaining SOC calculating unit 321, and an SOC setting unit 322.

Temperature increase instruction generation unit 320 determines whether temperature increase control of power storage units 10 and 20 is necessary, based on power storage unit temperatures Tb1, Tb2 from temperature detection units 12 and 22, respectively. More specifically, temperature increase instruction generation unit 320 determines whether each of power storage unit temperatures Tb1, Tb2 is lower than the corresponding lower limit temperature or not. When it is determined that the temperature of either one of power storage units 10, 20 is lower than the corresponding lower limit temperature, temperature increase instruction generation unit 320 generates the temperature increase instruction for the power storage unit of which temperature is lower than the corresponding lower limit temperature, when a signal input from the outside of the vehicle is received, or when the current time has reached a temperature increase start time.

If both of power storage unit temperatures Tb1, Tb2 are lower than the corresponding lower limit temperature, temperature increase instruction generation unit 320 generates the temperature increase instruction for the power storage unit higher in priority out of power storage units 10, 20. Here, priority is decided in accordance with a full charge capacity of the power storage unit, SOC of the power storage unit, and an amount of deviation of the power storage unit temperature from a prescribed operation temperature range.

As will be described later, the signal input to temperature increase instruction generation unit 320 includes signals SDU, KDU indicating that a door of the vehicle has been unlocked with a wireless door lock mechanism equipped in the vehicle, signals BON1, BON2 indicating a state of operation of a temperature increase button 400 provided in the vicinity of a driver's seat in the vehicle, signal OP indicating that charge connector 60 has been opened, a signal DMN indicating a temperature increase request from a not-shown house, and an output signal MP from a portable telephone 380. As the information necessary for determining the temperature increase start time, an amount of change X1 in SOC of power storage unit 10, an amount of change X2 in SOC of power storage unit 20, and a charge end time (set time ST) set by the user, are input to temperature increase instruction generation unit 320.

Remaining SOC calculating unit 321 calculates the amount of change X1 of SOC necessary for increasing temperature of power storage unit 10, based on the temperature T1$b$ of power storage unit 10. Remaining SOC calculating unit 321 sets the amount of change X1 based on a difference between the power storage unit temperature Tb1 and the lower limit temperature of power storage unit 10.

By way of example, remaining SOC calculating unit 321 stores a map defining correspondence of the amount of change X1 to the difference between the power storage unit temperature Tb1 and the lower limit temperature of power storage unit 10, and it may determine the amount of change X1 by looking up the map. Alternatively, remaining SOC calculating unit 321 stores in advance SOC1B as the SOC of power storage unit 10 in the fully charged state, and it may calculate current SOC of power storage unit 10 based on the power storage unit temperature Tb1, charge/discharge current value Ib1 and charge/discharge voltage value Vb1. Here, if the difference between SOC1B and the current SOC of power storage unit 10 is larger than the amount of change X1 calculated from the map, remaining SOC calculating unit 321 sets the difference as the amount of change X1. The amount of change X2 is calculated in the similar manner as that for X1.

SOC setting unit 322 sets the target SOC value to be applied to converter ECU 34 shown in FIG. 1. SOC setting unit 322 sets the target SOC value of power storage unit 10 to SOC1A (for example, 50%) that is lower by the amount of change X1 (for example, 30%) from SOC1B (for example, 80%), before receiving the temperature increase instruction WCM1 from temperature increase instruction generation unit 320. After receiving temperature increase instruction WCM1, SOC setting unit 322 sets the SOC target value to SOC1B.

When the temperature of power storage unit 20 is to be increased, SOC setting unit 322 performs an operation similar to that described above. The operation corresponds to the above-described operation with temperature increase instruction WCM1 changed to temperature increase instruction WCM2, SOC1A to SOC2A and SOC1B to SOC2B.

Figure 4:
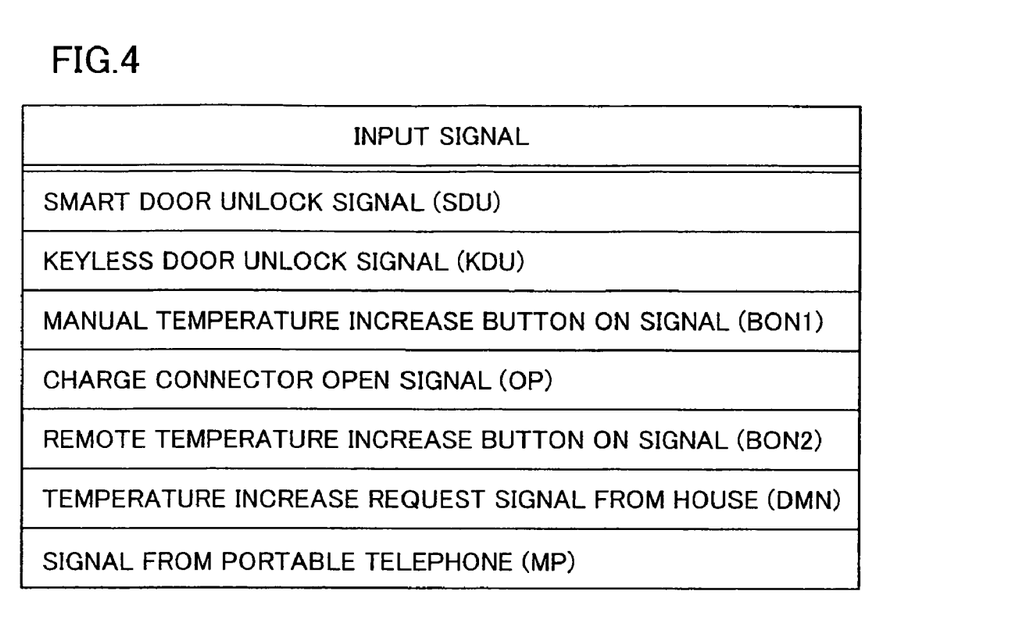
FIG. 4 illustrates signals input to a temperature increase instruction generation unit 320.

FIG. 4 shows signals input to temperature increase instruction generation unit 320.

Referring to FIGS. 3 and 4, seven signals in total are input to temperature increase instruction generation unit 320.

The first and second input signals are smart door unlock signal SDU and keyless door unlock signal KDU. These signals are signals transmitted from a body ECU (not shown) controlling lock/unlock of the door to temperature increase instruction generation unit 320 as the signal indicating unlock of the door when the door of the vehicle is unlocked as a result of matching between an ID code included in a signal transmitted from a wireless transmitter contained in the key and an ID code provided to the vehicle, in the vehicle provided with a wireless door lock mechanism.

Specifically, smart door unlock signal SDU is adapted to what is called a "smart entry system," which is a function to allow lock/unlock of the door of the vehicle or start of the engine without using a mechanical key and represents one form of the wireless door lock mechanism. More specifically, when the smart door unlock function included in the smart entry system (for example, a function to unlock the door when the user carrying the smart key holds a handle outside the driver's seat in a sensing area outside the vehicle) is actuated, the body ECU generates smart door unlock signal SDU and transmits the signal to temperature increase instruction generation unit 320.

In addition, keyless door unlock signal KDU is adapted to a keyless entry system representing another form of the wireless door lock mechanism. More specifically, the body ECU generates keyless door unlock signal KDU and transmits the signal to temperature increase instruction generation unit 320 in response to unlock of the door as a result of actuation of the wireless remote control function contained in the key.

The third input signal is the signal BON1 indicating that temperature increase button 400 is set to the ON state by a manual operation by the user. Temperature increase button 400 is provided in the vicinity of the driver's seat in the vehicle, and it is set to ON as a result of the user's manual operation or remote operation through the remote controller. Then, temperature increase button 400 transmits the temperature increase request from the user to temperature increase instruction generation unit 320 in response to setting to ON.

The fourth input signal is the signal OP indicating that charge connector 60 shown in FIG. 1 has been opened (hereinafter also referred to as the charge connector opening signal). For example, charge connector opening signal OP is generated in response to removal of charge connector 60 from a power outlet provided on the house side by the user before the user uses the vehicle. Generated charge connector opening signal OP is transmitted from opening and closing detection unit 62 provided in charge connector 60 to temperature increase instruction generation unit 320.

The fifth input signal is the signal BON2 indicating that temperature increase button 400 is set to the ON state by a remote operation using a remote controller 360 by the user.

The sixth input signal is the temperature increase request signal DMN generated by the user in the house to the vehicle. By way of example, temperature increase request signal DMN is issued when starting capability of the vehicle in an environment at a low temperature is desirably ensured by warming the power storage unit in advance before the user uses the vehicle.

The seventh input signal is the output signal MP from portable telephone 380. Generally, a user more often operates portable telephone 380 than remote controller 360. Therefore, if temperature increase instruction generation unit 320 can be activated to generate the temperature increase instruction by the user operating portable telephone 380, it would be more convenient for the user.

In response to these input signals, temperature increase instruction generation unit 320 generates a temperature increase instruction (WCM1 or WCM2) for the power storage unit of which temperature is lower than the corresponding lower limit temperature, and outputs it to SOC setting unit 322.

[Temperature Increase Control Process]

As described above, in the present embodiment, power is exchanged between the commercial power supply and the power storage unit. Therefore, in the present embodiment, it becomes possible to increase the temperature of power storage unit without consuming electric power of the power storage unit. In the following, temperature increase control in accordance with the present embodiment will be described.

In the following description, however, an example will be described in which temperature Tb1 of power storage unit 10 is lower than the lower limit value and hence temperature of power storage unit 10 is increased. The same operation as will be described in the following is performed to increase the temperature of power storage unit 20.

Figure 5:
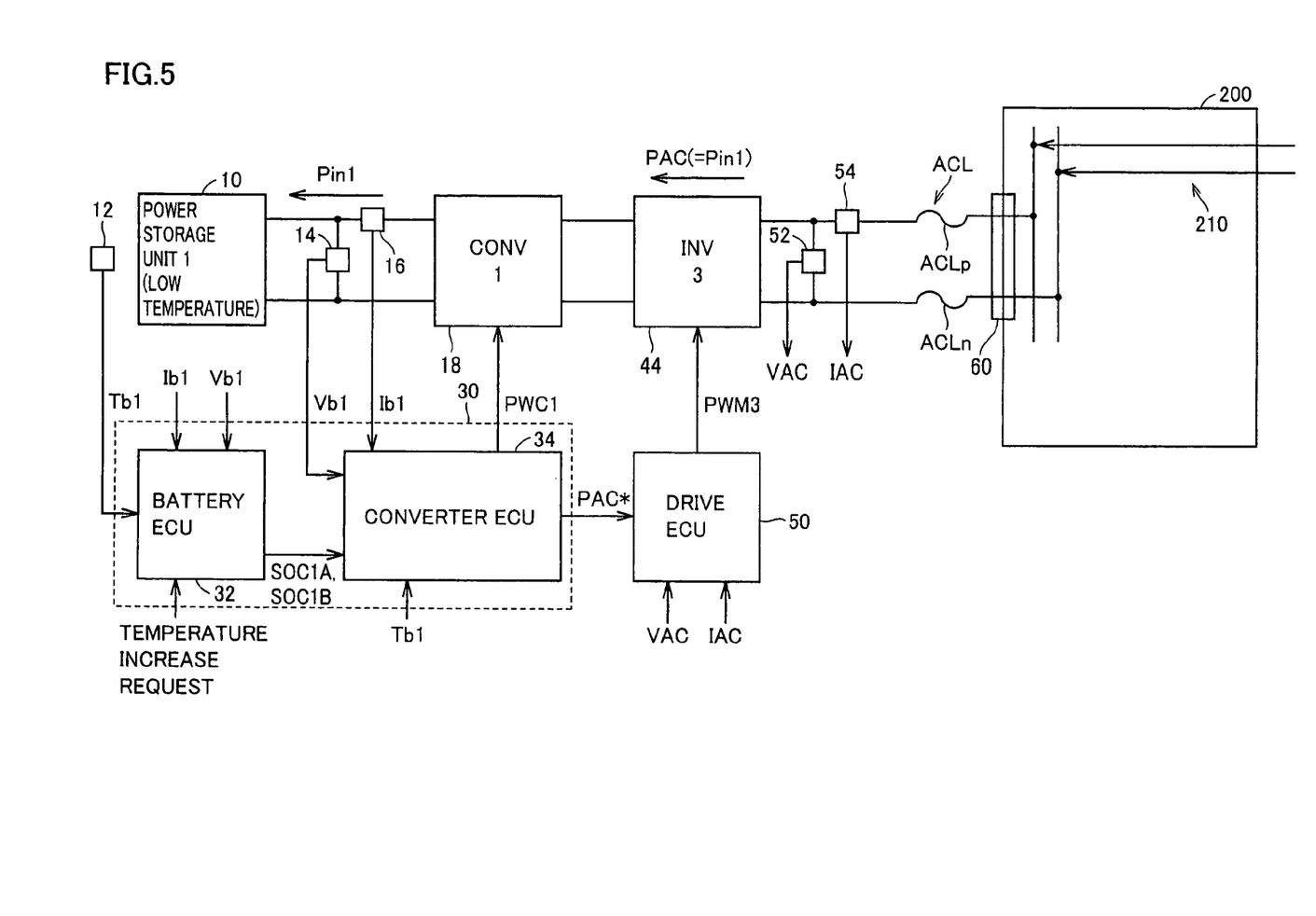
FIG. 5 is a block diagram illustrating power supply from a commercial power supply to the power storage unit.

FIG. 5 is a block diagram illustrating power supply from the commercial power supply to the power storage unit.

Referring to FIG. 5, the vehicle is connected to a power outlet of house 200 by a charge connector 60 through supply line ACL. To the vehicle, commercial power supplied through commercial power supply line 210 to house 200 is applied. At this time, power storage unit 10 as the object of temperature increase is charged by the commercial power from house 200. Therefore, power storage unit 10 has its temperature increased because of self heat generation.

More specifically, when charge connector 60 is coupled to the power outlet of house 200, supply line ACL and commercial power supply line 210 are electrically connected.

Converter ECU 34 generates a switching instruction PWC1 of converter 18 that corresponds to the power storage unit 10 as the object of temperature increase. Converter ECU 34 determines a target supply power PAC* for the commercial power supply, and outputs it to drive ECU 50.

Drive ECU 50 generates a switching instruction PWM3 of inverter 44, based on the applied target supply power PAC*. Consequently, power exchange between the commercial power supply and power storage unit 10 as the object of temperature increase starts.

First, battery ECU 32 sets the target SOC value of power storage unit 10 to SOC1A. Converter ECU 34 controls converter 18 such that the SOC value of power storage unit 10 attains to SOC1A. Specifically, converter ECU 34 determines a target charge/discharge power P1* of power storage unit 10 based on SOC1A. Then, based on power difference between the determined target charge/discharge power P1* and the charge/discharge power P1 of power storage unit 10, converter ECU 34 generates the switching instruction PWC1 for converter 18.

Further, converter ECU 34 determines the target supply power PAC* for the commercial power supply to be the charge power Pin1 for power storage unit 10, and outputs the target supply power PAC* to drive ECU 50. Based on power difference between the applied target supply power PAC* and the actual value of supplied power PAC, drive ECU 50 generates a switching instruction PWM3 of inverter 44. It is noted that the actual value of supply power PAC is calculated by multiplying the supplied current IAC from supply current detection unit 54 by the supplied voltage VAC from supply voltage detection unit 52.

Receiving the temperature increase request (smart door unlock signal SDU, keyless door unlock signal KDU or the like), battery ECU 32 changes the target SOC value to be output to converter ECU34 from SOC1A to SOC1B. Then, converter ECU 34 controls converter 18 such that the SOC value of power storage unit 10 attains to SOC1B. Here, converter ECU34 changes the target charge/discharge power P1* of power storage unit 10 based on SOC1B, and based on power difference between the target charge/discharge power P1* and the charge/discharge power of power storage unit 10, changes the switching instruction PWC1. Further, converter ECU34 changes the target supply power PAC* (charge power Pin1 to power storage unit 10), and outputs the target supply power PAC* to drive ECU 50. Based on power difference between the applied target supply power PAC* and the actual value of supply power PAC, drive ECU 50 generates a switching instruction PWM3 of inverter 44. Accordingly, the temperature of power storage unit 10 increases as power storage unit 10 is charged.

Figure 6:
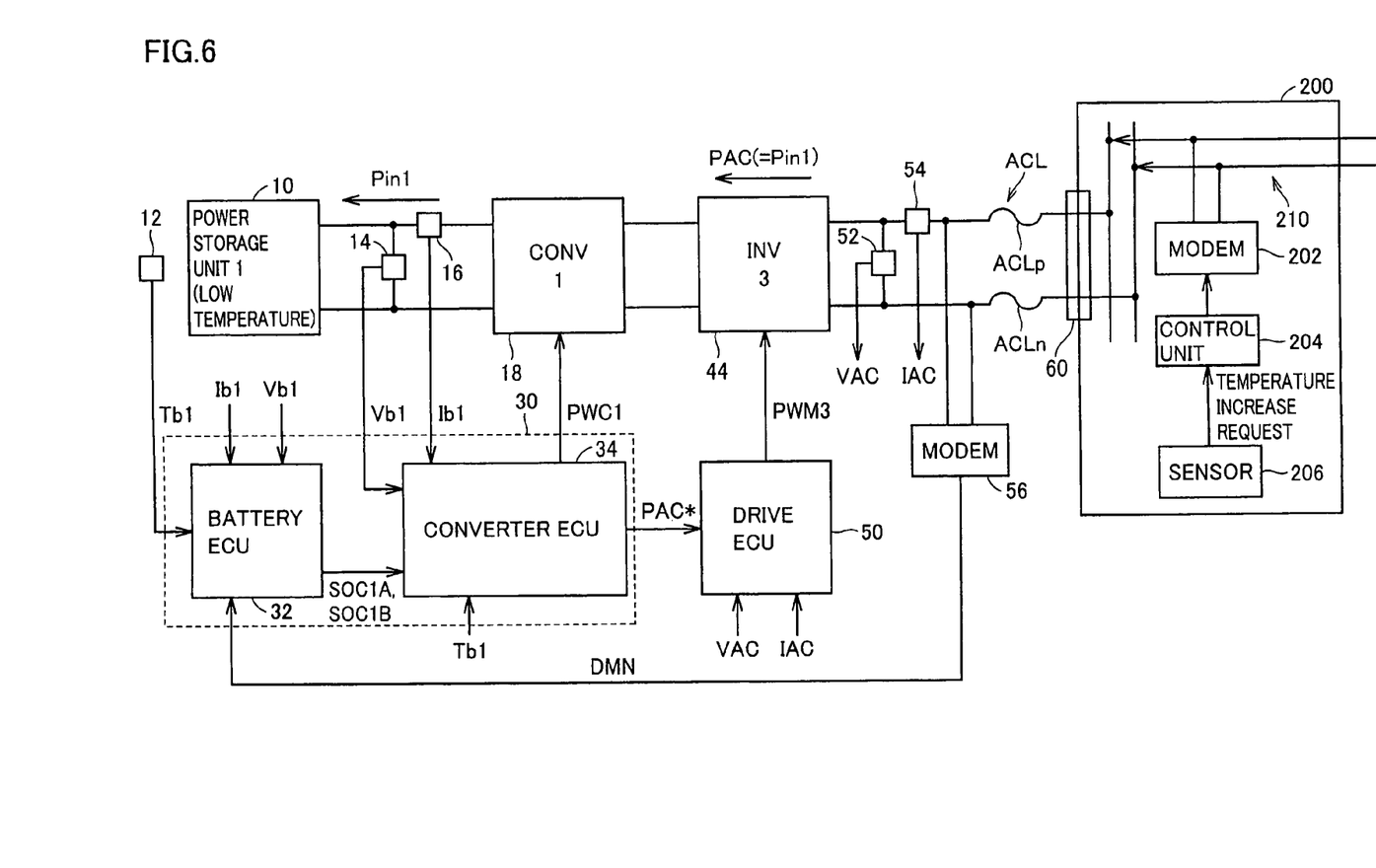
FIG. 6 illustrates a configuration of a house 200, for transmitting a temperature increase request signal from house 200 of FIG. 5 to the vehicle.

FIG. 6 illustrates a configuration of house 200, for transmitting the temperature increase request signal from house 200 shown in FIG. 5 to the vehicle.

Referring to FIGS. 6 and 5, when temperature increase control from house 200 to power storage unit 100 is to be executed, a modem 202, a control unit 204 and a sensor 206 are additionally installed in house 200 shown in FIG. 5.

Modem 202 transmits/receives information to/from a vehicle that is electrically connected. Modem 202 is connected between lines of commercial power supply 210, modulates information signal applied from control unit 204 and superposes the result on a current flowing through commercial power supply line 210, and extracts a modulated signal included in the current flowing through power supply line 210, demodulates the signal to information signal, and outputs the result to control unit 204.

Control unit 204 is capable of managing the state of charge of power storage unit of the vehicle through transmission/reception of information to/from the vehicle, and capable of receiving the temperature increase request from sensor 206. When a temperature increase request is applied from sensor 206, control unit 204 transmits the temperature increase request signal DMN to the vehicle through modem 202.

Sensor 206 outputs the temperature increase request when, for example, the user going out is detected. Various sensors may be used as sensor 206. For example, if sensor 206 is a sensor for detecting opening/closing of front door, sensor 206 outputs the temperature increase request when the user opens/closes the front door.

In the vehicle, modem 56 is connected between positive supply line ACLp and negative supply line ACLn, enabling transmission/reception of information to/from house 200. Receiving the temperature request signal DMN transmitted from house 200 via modem 56, battery ECU 32 changes the target SOC value output to converter ECU 34 from SOC1A to SOC1B.

Figure 7:
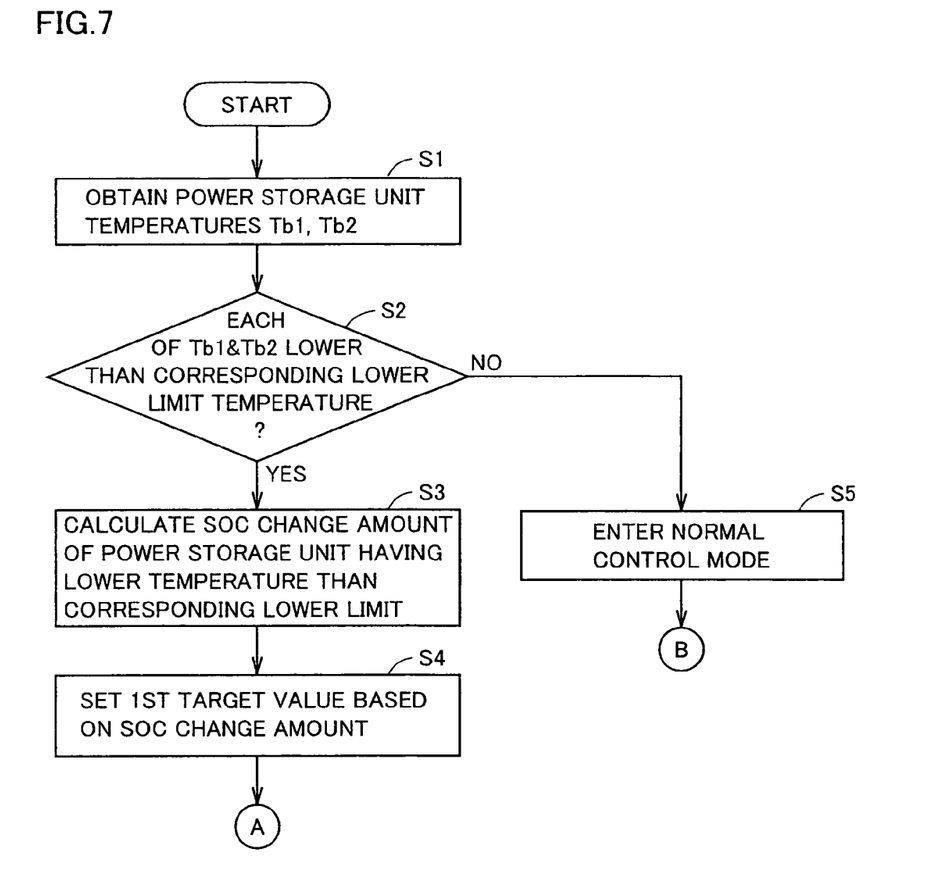
FIG. 7 is a flowchart for realizing temperature increase control by a battery ECU 32 shown in FIG. 3.
Figure 8:
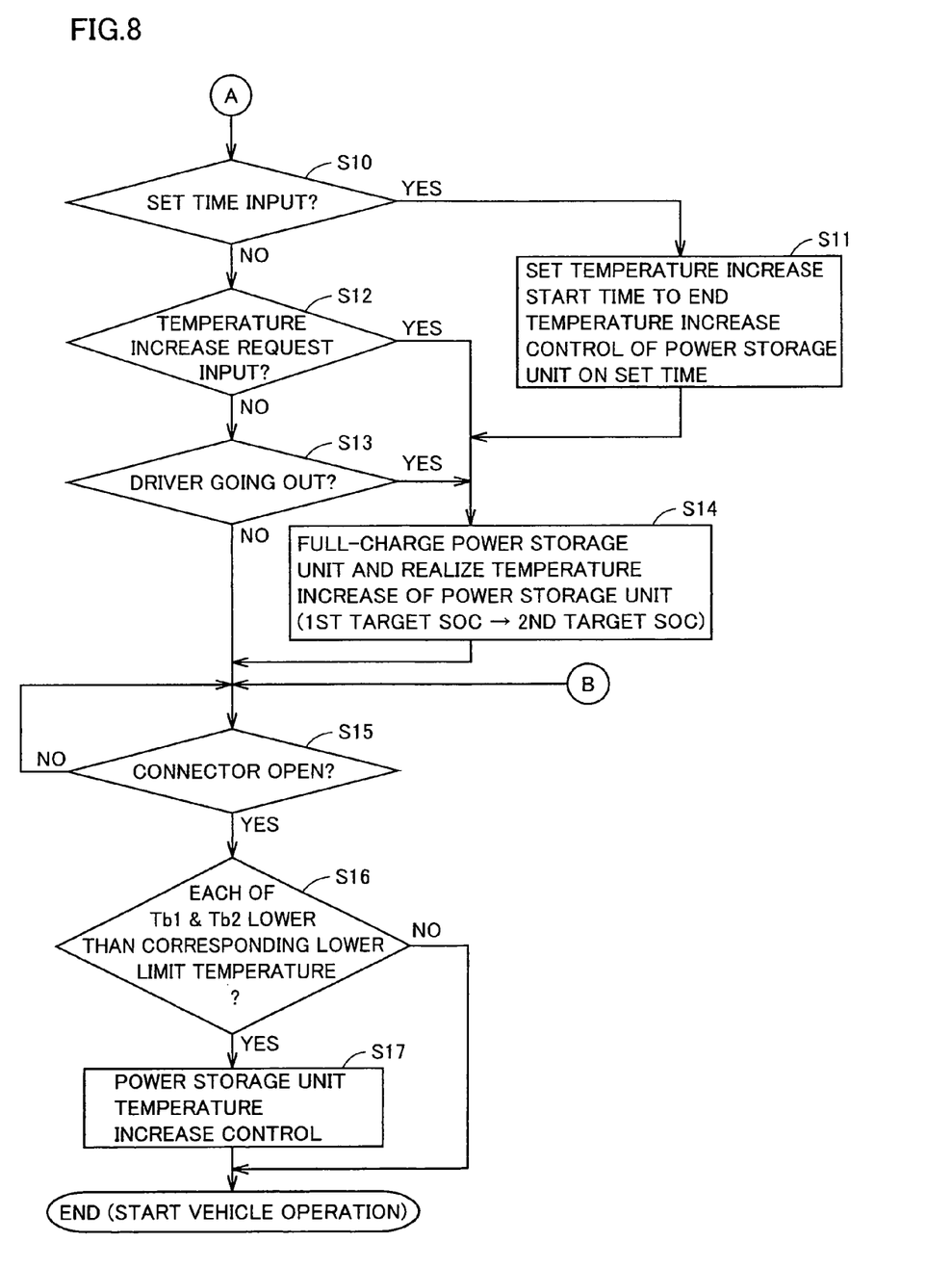
FIG. 8 is a flowchart for realizing temperature increase control by the battery ECU 32 shown in FIG. 3.

FIGS. 7 and 8 are flowcharts for realizing the temperature increase control by battery ECU 32 shown in FIG. 3. The process of the flowcharts are called from a prescribed main routine and executed at every constant time interval or every time prescribed conditions are satisfied.

Referring to FIGS. 7 and 3, temperature increase instruction generation unit 320 and remaining SOC calculating unit 321 obtain power storage unit temperatures Tb1 and Tb2 from temperature detection units 12 and 22 (step S1). Temperature increase instruction generation unit 320 determines whether each of the obtained power storage unit temperatures Tb1 and Tb2 is lower than the corresponding lower limit temperature (step S2).

If either one of power storage unit temperatures Tb1 and Tb2 is lower than the corresponding lower limit temperature (YES at step S2), remaining SOC calculating unit 321 calculates the amount of change of SOC (remaining SOC) that is necessary to increase the temperature (step S3). Remaining SOC calculating unit 321 calculates the amount of change (amounts of change X1, X2) of SOC necessary to increase the temperature of power storage unit as the object of temperature increase, based on the current temperature of the power storage unit.

If both of power storage unit temperatures Tb1 and Tb2 are lower than the corresponding lower limit temperatures, remaining SOC calculating unit 321 calculates the amount of change for the power storage unit of higher priority.

Further, at step S3, temperature increase instruction generation unit 320 determines the temperature increase instruction to be output, of temperature increase instructions WCM1 and WCM2, based on power storage unit temperatures Tb1 and Tb2.

In the following, by way of example, temperature increase control of power storage unit 10 will be described. SOC setting unit 322 determines the target SOC value of power storage unit 10, that is, SOC1A (first target SOC), based on the amount of change X1 (remaining SOC) applied from remaining SOC calculating unit 321 (step S4). At step S4, SOC setting unit 322 determines SOC1A by subtracting X1 from the second target value SOC (SOC1B) of power storage unit 10.

If power storage unit temperatures Tb1 and Tb2 are both not lower than the corresponding lower limit temperatures at step S2 (NO at step S2), battery ECU 32 enters normal operation mode (step S5). Then, battery ECU 32 executes a process of step S15, which will be described later. Here, the "normal operation mode" means the control mode in which the power storage unit is charged without temperature increase control. In that case, SOC setting unit 322 sets only the second target SOC.

Next, referring to FIGS. 8 and 3, the process after step S4 will be described. Temperature increase instruction generation unit 320 determines whether there has been a user input of set time ST (step S1). If there has been an input of set time ST (YES at step S10), temperature increase instruction generation unit 320 sets a temperature increase start time of power storage unit 10 such that temperature increase control of power storage unit 10 ends (power storage unit 10 attains to the fully charged state) at the set time ST (step S11). As already described, the temperature increase start time is determined based on the amount of change X1 of SOC and on the set time ST.

For instance, temperature increase instruction generation unit 320 stores in advance the time-change rate of SOC of power storage unit 10 when a prescribed charging current is caused to flow. Temperature increase instruction generation unit 320 determines the temperature increase start time based on the amount of change X1, the time-change rate, and the set time ST. Other method of determining temperature increase start time may be available.

When the current time reaches the temperature increase start time, temperature increase instruction generation unit 320 outputs temperature increase instruction WCM1 and ends the process of step S11. When the process of step S11 ends, the process of step S14, which will be described later, is executed.

If there is no input of set time ST (NO at step S10), temperature increase instruction generation unit 320 determines whether there is an input of temperature increase request from outside (step S12). Here, "outside" means outside of the battery ECU 32. Further, "input of temperature increase request" means input of any of smart door unlock signal SDU, keyless door unlock signal KDU, signals BON1 and BON2 from temperature increase button 400 and output signal MP from portable telephone 380, to temperature increase instruction generation unit 320. When there is an input of temperature increase request (YES at step S12), temperature increase instruction generation unit 320 outputs temperature increase instruction WCM1 and executes the process of step S14. If there is no input of temperature increase request to temperature increase instruction generation unit 320 (NO at step S12), temperature increase instruction generation unit 320 executes the process of step S13.

At step S13, temperature increase instruction generation unit 320 determines whether the driver (user) goes out or not. As described above, if the driver goes out, a temperature increase request is transmitted from a sensor 206 provided in house 200 to control unit 204. Receiving the temperature increase request, control unit 204 controls modem 202 and causes modem 202 to output temperature increase request signal DMN. Temperature increase instruction generation unit 320 receives the temperature increase request signal DMN via modem 56. Specifically, determination as to whether the driver (user) goes out or not by temperature increase instruction generation unit 320 corresponds to determination as to whether there is an input of temperature increase request signal DMN or not, by temperature increase instruction generation unit 320.

If temperature increase request signal DMN is input to temperature increase instruction generation unit 320 (YES at step S13), temperature increase instruction generation unit 320 outputs temperature increase instruction WCM1, and thereafter executes the process of step S14. If temperature increase request signal DMN is not input to temperature increase instruction generation unit 320 (NO at step S13), temperature increase instruction generation unit 320 executes the process of step S15, which will be described later.

At step S14, SOC setting unit 322 receives temperature increase instruction WCM1 and changes the target SOC value from SOC1A (first target value) to SOC1B (second target value). Consequently, power storage unit 10 is charged until it reaches the fully charged state, and temperature increase of power storage unit 10 is realized.

At step S15, temperature increase instruction generation unit 320 determines whether or not charge connector 60 has been opened. That the charge connector 60 is opened means end of charging from commercial power supply to power storage unit 10. Temperature increase instruction generation unit 320 executes the process of step S16 if it receives a signal OP (YES at step S15), and otherwise (NO at step S15), it repeats the determination process of step S15.

At step S16, temperature increase instruction generation unit 320 determines whether or not each of the power storage unit temperatures Tb1 and Tb2 is lower than the corresponding lower limit temperature. If the temperature of power storage unit at the start of temperature increase is significantly lower than the lower limit, or if the power storage unit has high thermal capacity, it is possible that both power storage unit temperatures Tb1 and Tb2 are lower than the corresponding lower limit temperatures even after the power storage units are charged to the full charged state at step S14.

By way of example, if the temperature Tb1 of power storage unit 10 is lower than the lower limit temperature (YES at step S16), temperature increase instruction generation unit 320 outputs a temperature increase instruction WCM3 for further increasing the temperature Tb1 of power storage unit 10 (step S17). Then, SOC setting unit 322 changes the SOC target value from SOC1B to SOC1C (where SOC1B>SOC1C). As a result, power storage unit 10 is discharged, and heat generates in power storage unit 10. Thus, the temperature of power storage unit 10 can further be increased.

If the process of step S17 takes place, part of electric power stored in power storage unit 10 is consumed, for example, by converter 18, inverter 3 and the like. In most cases, however, the temperature Tb1 of power storage unit 10 should have increased close to the lower limit temperature as a result of the process at step S14. Therefore, according to the present embodiment, even if it becomes necessary to consume electric power stored in power storage unit 10, the amount of power consumption is small.

As another possible method of further increasing the temperature of power storage unit 10, if the state of charge of power storage unit 20 is not full, for example, SOC setting unit 322 may set target values SOC1C and SOC2C of power storage units 10 and 20 such that power is supplied from power storage unit 10 to power storage unit 20. According to this method, though electric power is consumed by converters 18 and 28, the power consumption can be made smaller than in the above-described method.

When the process of step S17 ends, the temperature increase control process ends. Further if power storage unit temperatures Tb1 and Tb2 are both not lower than the corresponding lower limit temperatures at step S16 (NO at step S16), the temperature increase control process ends. After the end of temperature increase control process, various processes, including start of vehicle operation, are executed.

The embodiment of the present invention will be generally summarized again. Power supply device 100 mounted on a vehicle includes power storage unit 10 that is capable of being charged and control unit 30 that controls charging of power supply unit 10. Control unit 30 includes: SOC setting unit 322, which sets, at the start of charging power storage unit 10, the target value of state of charge (SOC) of power storage unit 10 to SOC1A (first value) based on the condition of power storage unit 10 and when it receives temperature increase instruction WCM1 after the start of charging, sets the target value to predetermined SOC1B (second value) higher than SOC1A and converter ECU 34, which executes the charging process so that the state of charge of power storage unit 10 attains to the target value.

As described above, power storage unit 10 is charged to some extent and temperature increase control is performed in accordance with the temperature increase instruction WCM1, so that it becomes possible to perform temperature increase control immediately before the use by the user. As a result, energy necessary for increasing the temperature of power storage unit 10 can be reduced, and hence, temperature of power storage unit 10 can more reliably be increased while preventing decrease of energy efficiency.

It is noted that temperature increase instruction generation unit 320 corresponds to "change instruction generation unit" of the present invention, and temperature increase instruction WCM1 corresponds to the "change instruction" of the present invention.

Preferably, the information representing the state of power storage unit 10 is the information of temperature around power storage unit 10 (power storage unit temperature Tb1). Control unit 30 further includes remaining SOC calculating unit 321 calculating amount of change (remaining SOC) X1 of power storage unit 10 necessary for increasing temperature of power storage unit 10. SOC setting unit 322 stores SOC1B in advance, and subtracts X1 from SOC1B to calculate SOC1A.

More preferably, control unit 30 further includes temperature increase instruction generation unit 320 that generates temperature increase instruction WCM1. Temperature increase instruction generation unit 320 determines a start time of starting change of state of charge of power storage unit 10, based on designated charge end time (set time ST) and amount of change X1. When the current time reaches the start time, temperature increase instruction generation unit 320 generates the temperature increase instruction WCM1.

More preferably, control unit 30 further includes temperature increase instruction generation unit 320 generating temperature increase instruction WCM1 in response to a temperature increase request from outside.

More preferably, temperature increase instruction generation unit 320 outputs temperature increase instruction WCM1 when it receives temperature increase request DMN from modem 202 provided in house 200. Modem 202 transmits temperature increase request signal DMN in response to a detection result of sensor 206 detecting the user going out from house 200.

More preferably, temperature increase instruction generation unit 320 outputs temperature increase instruction WCM1 in response to a remote operation by the user (operation of remote controller 360, portable telephone 380 or the like).

It becomes possible to change remaining SOC (amount of change X1) in accordance with the power storage unit temperature Tb1 or charge end time (or running start time) and, therefore, power storage unit 10 can be fully charged and the temperature of power storage unit can be increased within a short period of time from when SOC setting unit 322 received temperature increase instruction WCM1. Therefore, temperature of power storage unit 10 can more reliably be increased while preventing decrease of energy efficiency.

According to the present embodiment, the vehicle includes any of the above-described power supply devices. This ensures charge/discharge performance of power storage unit and, therefore, running performance of the vehicle can be improved.

In the description above, power storage unit 10 may be replaced by power storage unit 20, temperature increase instruction WCM1 by temperature increase instruction WCM2, SOC1A and SOC1B by SOC2A and SOC2B, power storage unit temperature Tb1 by power storage unit temperature Tb2, and amount of change X1 by amount of change X2. In that case, effects similar to those described above can be attained for power storage unit 20.

Further, power supply device 100 shown in FIG. 1 may be configured to include either one of power storage units 10 and 20 and a converter corresponding to the power storage unit.

Though temperature increase instruction generation unit 320 sets the temperature increase start time based on the input set time ST in the present embodiment, temperature increase instruction generation unit 320 may be configures to allow cancellation of the setting in accordance with a user instruction.

Although the present invention has been described and illustrated in detail, it is clearly understood that the same is by way of illustration and example only and is not to be taken by way of limitation, the scope of the present invention being interpreted by the terms of the appended claims.

The invention claimed is:

1. A power supply device mounted on a vehicle, comprising:
a power storage unit capable of being charged; and
a control unit controlling charging of said power storage unit,
said control unit including
a change instruction generation unit generating a change instruction instructing change of state of charge of said power storage unit, based on information representing possibility of use of said vehicle by a user,
a target value setting unit setting, when charging of said power storage unit starts, a target value of state of charge of said power storage unit to a first value based on the condition of said power storage unit, and setting, when said change instruction is received after the start of charging of said power storage unit, said target value to a second value higher than said first value, and
a charge processing unit executing a charging operation based on said target value, wherein
information representing the condition of said power storage unit is information of temperature around said power storage unit;
said control unit further includes
an amount of change calculating unit calculating an amount of change in state of charge of said power storage unit necessary to increase temperature of said power storage unit; and
said target value setting unit stores said second value in advance, and calculates said first value by subtracting said amount of change from said second value.

2. The power supply device according to claim 1, wherein said change instruction generation unit determines a start time of starting change of the state of charge of said power storage unit based on a designated charge end time and said amount of change, and when current time reaches said start time, generates said change instruction.

3. The power supply device according to claim 1, wherein said change instruction generation unit generates said change instruction in response to a temperature increase request input from outside.

4. The power supply device according to claim 3, wherein said change instruction generation unit outputs said change instruction when it receives said temperature increase request from a transmission device provided in a house; and said transmission device transmits said temperature increase request in response to a result of detection by a sensor detecting a user going out from said house.

5. The power supply device according to claim 3, wherein said change instruction generation unit outputs said change instruction in response to a remote operation by a user.

6. A vehicle, comprising:

a power supply device, said power supply device including a power storage unit capable of being charged, and a control unit controlling charging of said power storage unit; and said control unit having a change instruction generation unit generating a change instruction instructing change of state of charge of said power storage unit, based on information representing possibility of use of said vehicle by a user, a target value setting unit setting, when charging of said power storage unit starts, a target value of state of charge of said power storage unit to a first value based on the condition of said power storage unit, and setting, when said change instruction is received after the start of charging of said power storage unit, said target value to a second value higher than said first value, and a charge processing unit executing a charging operation based on said target value, wherein information representing the condition of said power storage unit is information of temperature around said power storage unit;

said control unit further includes an amount of change calculating unit calculating an amount of change in state of charge of said power storage unit necessary to increase temperature of said power storage unit; and said target value setting unit stores said second value in advance, and calculates said first value by subtracting said amount of change from said second value.

7. The vehicle according to claim 6, wherein said change instruction generation unit determines a start time of starting change of the state of charge of said power storage unit based on a designated charge end time and said amount of change, and when current time reaches said start time, generates said change instruction.

8. The vehicle according to claim 6, wherein said change instruction generation unit generates said change instruction in response to a temperature increase request input from outside.

9. The vehicle according to claim 8, wherein said change instruction generation unit outputs said change instruction when it receives said temperature increase request from a transmission device provided in a house; and said transmission device transmits said temperature increase request in response to a result of detection by a sensor detecting a user going out from said house.

10. The vehicle according to claim 8, wherein said change instruction generation unit outputs said change instruction in response to a remote operation by a user.

* * * * *